US012789766B2

(12) United States Patent
Hayes

(10) Patent No.: US 12,789,766 B2
(45) Date of Patent: Nov. 10, 2026

(54) EMERGENCY BRAKE CONTROL APPARATUS FOR A VEHICLE TRAIN

(71) Applicant: Bendix Commercial Vehicle Systems LLC, Avon, OH (US)

(72) Inventor: Thomas J. Hayes, Lakewood, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 174 days.

(21) Appl. No.: 18/672,535

(22) Filed: May 23, 2024

(65) Prior Publication Data

US 2025/0360897 A1 Nov. 27, 2025

(51) Int. Cl.
*B60T 8/17* (2006.01)
*B60T 8/72* (2006.01)

(52) U.S. Cl.
CPC .............. *B60T 8/1708* (2013.01); *B60T 8/72* (2013.01); *B60T 2210/36* (2013.01)

(58) Field of Classification Search
CPC ....... B60T 8/1708; B60T 8/72; B60T 2210/36
See application file for complete search history.

(56) References Cited

U.S. PATENT DOCUMENTS 3,953,080 A * 4/1976 Bremer ................... B60T 8/885 303/178
3,972,568 A * 8/1976 Fleischer ............. B60T 8/1764 303/166
5,080,445 A * 1/1992 Brearley ................. B60T 8/323 303/7
5,579,230 A * 11/1996 Lin ......................... B60T 8/172 180/197
2004/0012249 A1* 1/2004 Koelzer .................. B60T 8/323 303/3
2005/0029864 A1* 2/2005 Bauer ..................... B60T 17/18 303/123

(Continued)

FOREIGN PATENT DOCUMENTS

JP H06199220 A 7/1994
JP 2009198185 A 9/2009

OTHER PUBLICATIONS

Vehicle Speed Estimation Using Accelerometer and Wheel Speed Measurements, Song et al., Society of Automotive Engineers, Inc., 2002.

*Primary Examiner* — Lindsay M Low
*Assistant Examiner* — Susan E Scharpf
(74) *Attorney, Agent, or Firm* — Brian E. Kondas; Cheryl L. Greenly; Geoffrey A. Kudlo

(57) ABSTRACT

An emergency brake control apparatus is provided for a vehicle train having emergency brakes. The emergency brake control apparatus comprises a first speed source arranged to provide a first signal indicative of ground speed of the vehicle train. The emergency brake control apparatus also comprises a second speed source arranged to provide a second signal indicative of ground speed of the vehicle train. The emergency brake control apparatus further comprises a vehicle controller arranged to (i) control the emergency brakes based upon the first signal from the first speed source when the first signal is within a predetermined speed tolerance, and (ii) control the emergency brakes based upon the second signal from the second speed source when the first signal from the first speed source is outside of the predetermined speed tolerance.

19 Claims, 3 Drawing Sheets

(56) References Cited

U.S. PATENT DOCUMENTS

| | | | | |
|---|---|---|---|---|
| 2007/0174001 | A1 * | 7/2007 | Kjell | B60W 40/10 701/55 |
| 2022/0289255 | A1 * | 9/2022 | Soule | B61D 45/001 |
| 2025/0145131 | A1 * | 5/2025 | Sarangamath | B60Q 1/44 |

* cited by examiner

EMERGENCY BRAKE CONTROL APPARATUS FOR A VEHICLE TRAIN

BACKGROUND

The present application relates to vehicle brake systems, and is particularly directed to an emergency brake control apparatus for a vehicle train, such as a tractor coupled to one or more towed vehicles coupled to the tractor.

A typical vehicle train has a service brake system, a parking brake system, and an emergency brake system. The service brake system is the primary brake system that is used for slowing and stopping the vehicle train. The parking brake system is a mechanism designed to prevent movement of the vehicle train when the vehicle train is stationary. Parking brakes are usually applied to only the tractor of the vehicle train to prevent movement of the tractor and the one or more towed vehicles coupled to the tractor.

The emergency brake system is a mechanism designed to stop the vehicle train in the event of a failure of the service brake system to slow or stop the vehicle train. Emergency brakes are usually applied to only the one or more towed vehicles of the vehicle train to stop the vehicle train in the event of a failure of the service brake system to do so.

Accordingly, those skilled in the art continue with research and development efforts in the field of vehicle brake systems including emergency brake systems for vehicle trains.

SUMMARY

In accordance with one embodiment, an emergency brake control apparatus is provided for a vehicle train having emergency brakes. The emergency brake control apparatus comprises a first speed source arranged to provide a first signal indicative of ground speed of the vehicle train. The emergency brake control apparatus also comprises a second speed source arranged to provide a second signal indicative of ground speed of the vehicle train. The emergency brake control apparatus further comprises a vehicle controller arranged to (i) control the emergency brakes based upon the first signal from the first speed source when the first signal is within a predetermined speed tolerance, and (ii) control the emergency brakes based upon the second signal from the second speed source when the first signal from the first speed source is outside of the predetermined speed tolerance.

In accordance with another embodiment, an emergency brake control apparatus is provided for a vehicle train having emergency brakes. The emergency brake control apparatus comprises one or more wheel speed sensors providing corresponding one or more wheel speed signals. The emergency brake control apparatus also comprises a vehicle controller arranged to (i) monitor the one or more wheel speed signals from the one or more wheel speed sensors, (ii) determine vehicle ground speed based upon the one or more wheel speed signals from the one or more wheel speed sensors when no emergency braking event is occurring, and (iii) determine vehicle ground speed based upon an alternative speed source when an emergency braking event is occurring.

In accordance with yet another embodiment, a method of operating an emergency brake control apparatus is provided for a vehicle train having emergency brakes. The method comprises receiving a signal indicative of an emergency braking event occurring. The method also comprises switching from a wheel-sensor based speed source to an alternative speed source to determine vehicle ground speed when the signal indicative of an emergency braking event occurring is received. The method further comprises switching back from the alternative speed source to the wheel-sensor based speed source to determine vehicle ground speed when the signal indicative of an emergency braking event occurring is no longer received.

DETAILED DESCRIPTION

The present application is directed to an emergency brake control apparatus for a vehicle train such as a tractor and a number of towed vehicles coupled to the tractor. The specific construction of the emergency brake control apparatus may vary. It is to be understood that the disclosure below provides a number of embodiments or examples for implementing different features of various embodiments. Specific examples of components and arrangements are described to simplify the present disclosure. These are merely examples and are not intended to be limiting.

Figure 1:
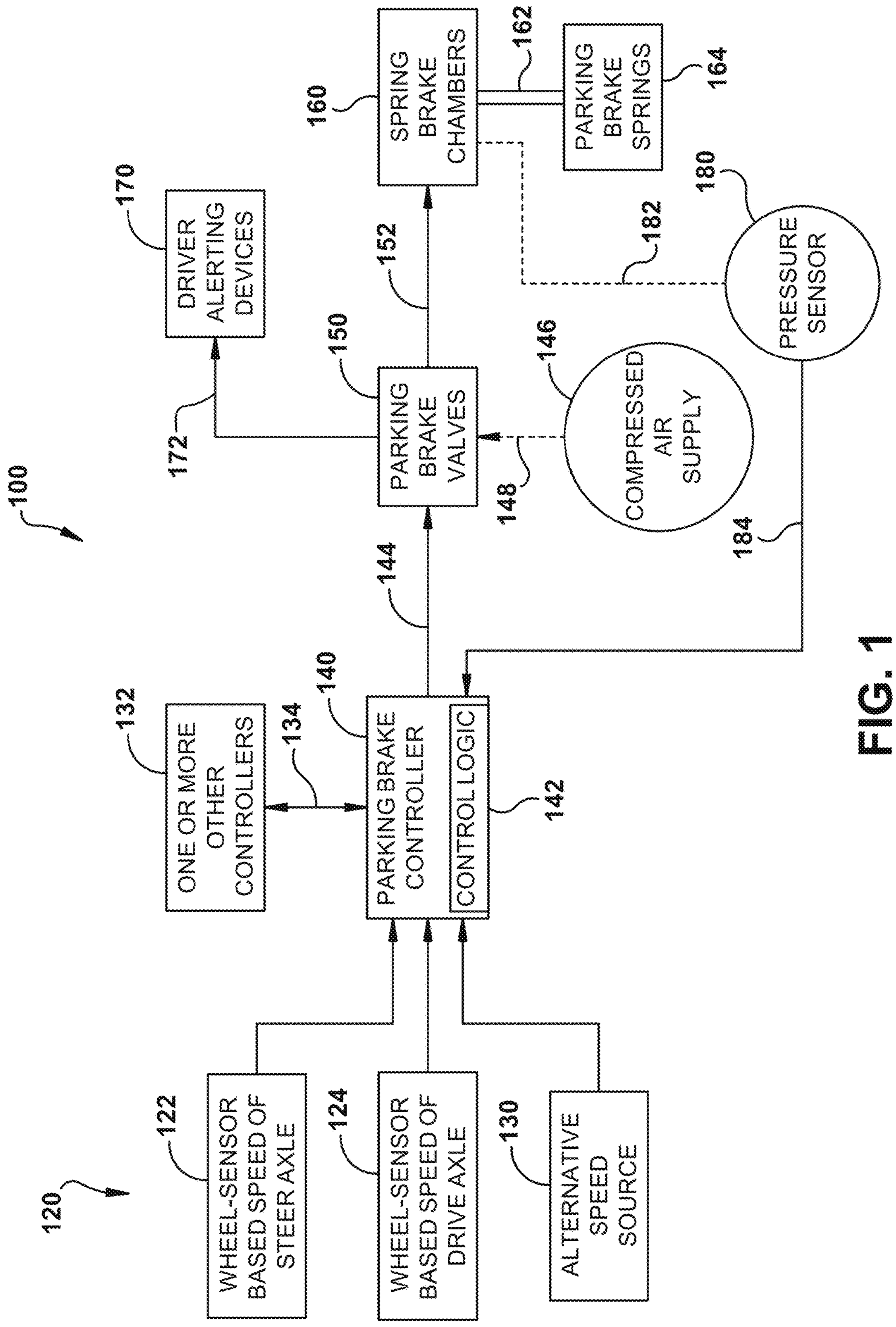
FIG. 1 is a schematic block diagram showing an example emergency brake control apparatus constructed in accordance with an embodiment.

Referring to FIG. 1, a schematic block diagram showing an example emergency brake control apparatus 100 constructed in accordance with an embodiment is illustrated. In FIG. 1, electrical line connections are shown as solid lines, pneumatic lines connections are shown as dashed lines, and mechanical couplings are shown as double solid lines.

Emergency brake control apparatus 100 includes a number of speed sources 120 that provide corresponding speed output signals. The speed sources 120 include but are not limited to a wheel-sensor based speed of a steer axle 122 of a tractor of a vehicle train (not shown), and a wheel-sensor based speed of a drive axle 124 of the tractor.

The speed sources 120 also include an alternative speed source 130. As an example, the alternative speed source 130 may comprise a global-positioning system (GPS) that can provide information, such as a ground speed of the vehicle train. As another example, the alternative speed source 130 may comprise a local vision-based system, such as a combination of a camera, a radar, a Lidar, and an inertial measurement unit, that provides ground speed of the vehicle train. Other alternative speed sources are possible.

Emergency brake control apparatus 100 also includes a parking brake controller 140 in the form of an electronic controller unit that is arranged to monitor the output signals from the speed sources 120. The speed sources 120 may be hardwired or communicate via a controller area network (CAN) bus, or a combination of both, to the parking brake controller 140. The parking brake controller 140 provides one or more control signals based upon control logic 142 that is stored in a data storage unit of the parking brake controller 140. More specifically, parking brake controller 140 provides signals on line 144 to control operation of parking brake valves 150. Compressed air supply 146 provides a source of compressed air in line 148 to parking brake valves 150. Parking brake valves 150 are controlled by parking brake controller 140 to vary pneumatic pressure in line 152 to one or more chambers of spring brake chambers 160.

When the emergency brakes of the vehicle are applied, the parking brake controller 140 provides signals on line 144 that are applied to parking brake valves 150 so as to exhaust air in one or more chambers of spring brake chambers 160. The spring brake chambers 160 are operatively coupled via line 162 in known manner to parking brake springs 164. When air in spring brake chambers 160 is exhausted and system air pressure drops to less than about 45 psi to 60 psi, parking brake springs 164 are activated to apply the vehicle parking brakes, as is known. Structure and operation of parking brake controller 140 and parking brake valves 150 for controlling operation of spring brake chambers 160 and parking brake springs 164 of the vehicle are conventional and, therefore, will not be further described.

Parking brake controller 140 also provides a number of signals on line 172 to a number of driver alerting devices 170, which may include visual devices, audio devices, and haptic devices. Other types of devices for alerting the vehicle driver are possible.

A pressure sensor 180 interconnects the parking brake controller 140 and the spring brake chambers 160. The pressure sensor 180 provides a signal on line 184 indicative of pressure in line 182, which corresponds to pressure in the spring brake chambers 160. The parking brake controller 140 monitors and responds to the signal on line 184 to indicate to the vehicle driver the threshold of air pressure in the spring brake chambers 160.

Optionally, the parking brake controller 140 is connected on CAN line 134 to one or more other vehicle controllers 132. The parking brake controller 140 may receive speed values via the CAN line 134 from the one or more other vehicle controllers 132. The one or more other vehicle controllers 132 are capable of enhancing performance of the parking brake controller 140 to carry out certain processes within the control logic 142. Although only the one CAN line 134 is shown in FIG. 1, it is conceivable that multiple CAN lines be used.

In accordance with an aspect of the present disclosure, the parking brake controller 140 monitors the output signals from the speed sources 120 and the pressure sensor 180, and provides one or more control signals to apply parking brakes (and thereby provide emergency brakes) based upon the output signals from the speed sources 120 and the pressure sensor 180, as will be described herein. The emergency brakes are provided in response to a request from either a human driver or an autonomous driver to apply the emergency brakes.

Figure 2:
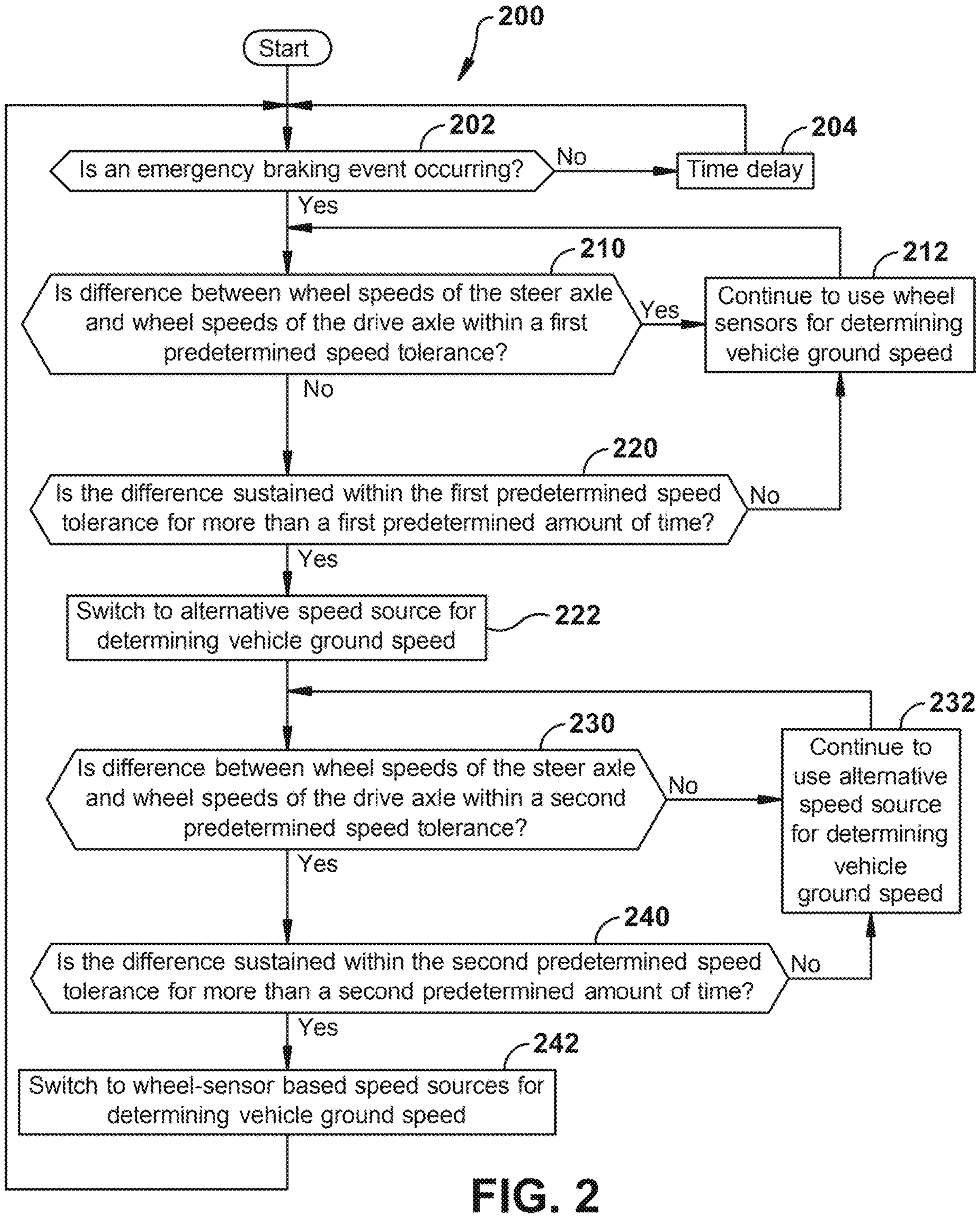
FIG. 2 is a flow diagram depicting an example method of operating the emergency brake control apparatus of FIG. 1 in accordance with an embodiment.

Referring to FIG. 2, a flow diagram 200 depicting an example method of operating the emergency brake control apparatus 100 of FIG. 1 in accordance with an embodiment is illustrated. In block 202, a determination is made as to whether an emergency braking event is occurring. If the determination in block 202 is negative, the process loops back on itself after a time delay as shown in block 204 to continue monitoring for occurrence of an emergency braking event. However, if the determination in block is affirmative (i.e., an emergency braking event is occurring), the process proceeds to block 210.

In block 210, a determination is made as to whether a difference between wheel speeds of the steer axle and wheel speeds of the drive axle is within a first predetermined speed tolerance. An example first predetermined speed tolerance is between about five (5) percent and about ten (10) percent of the difference. If the determination in block 210 is affirmative, the process proceeds to block 212 to continue using the wheels sensors on the steer axle and the wheel sensors on the drive axle to determine (e.g., calculate) vehicle ground speed. However, if the determination in block 210 is negative, the process proceeds to block 220.

In block 220, a determination is made as to whether the difference from block 210 is sustained within the first predetermined speed tolerance for more than a continuous first predetermined amount of time. An example first predetermined amount of time is about one second. If the determination in block 220 is negative, the process proceeds to block 212 to continue using the wheels sensors on the steer axle and the wheel sensors on the drive axle to determine vehicle ground speed. However, if the determination in block 220 is affirmative, the process proceeds to block 222 in which a switch is made from the wheel-sensor based speed sources 122, 124 (FIG. 1) to the alternative speed source 130 to determine vehicle ground speed. The process then proceeds to block 230.

In block 230, a determination is made as to whether a difference between wheel speeds of the steer axle and wheel speeds of the drive axle is within a second predetermined speed tolerance. The second predetermined speed tolerance may be the same as the first predetermined speed tolerance. An example second predetermined speed tolerance is between about five (5) percent and about ten (10) percent of the difference. If the determination in block 230 is negative, the process proceeds to block 232 to continue using the alternative speed source 130 to determine vehicle ground speed. However, if the determination in block 230 is affirmative, the process proceeds to block 240.

In block 240, a determination is made as to whether the difference from block 230 is sustained within the second predetermined speed tolerance for more than a continuous second predetermined amount of time. The second predetermined amount of time may be the same as the first predetermined amount of time. An example second predetermined amount of time is about one second. If the determination in block 240 is negative, the process proceeds to block 232 to continue using the alternative speed source 130 to determine vehicle ground speed. However, if the determination in block 240 is affirmative, the process proceeds to block 242 in which a switch is made from the alternative speed source 130 to the wheel-sensor based speed sources 122, 124 to determine vehicle ground speed. The process then returns back to block 202 to continue monitoring for occurrence of an emergency braking event.

Figure 3:
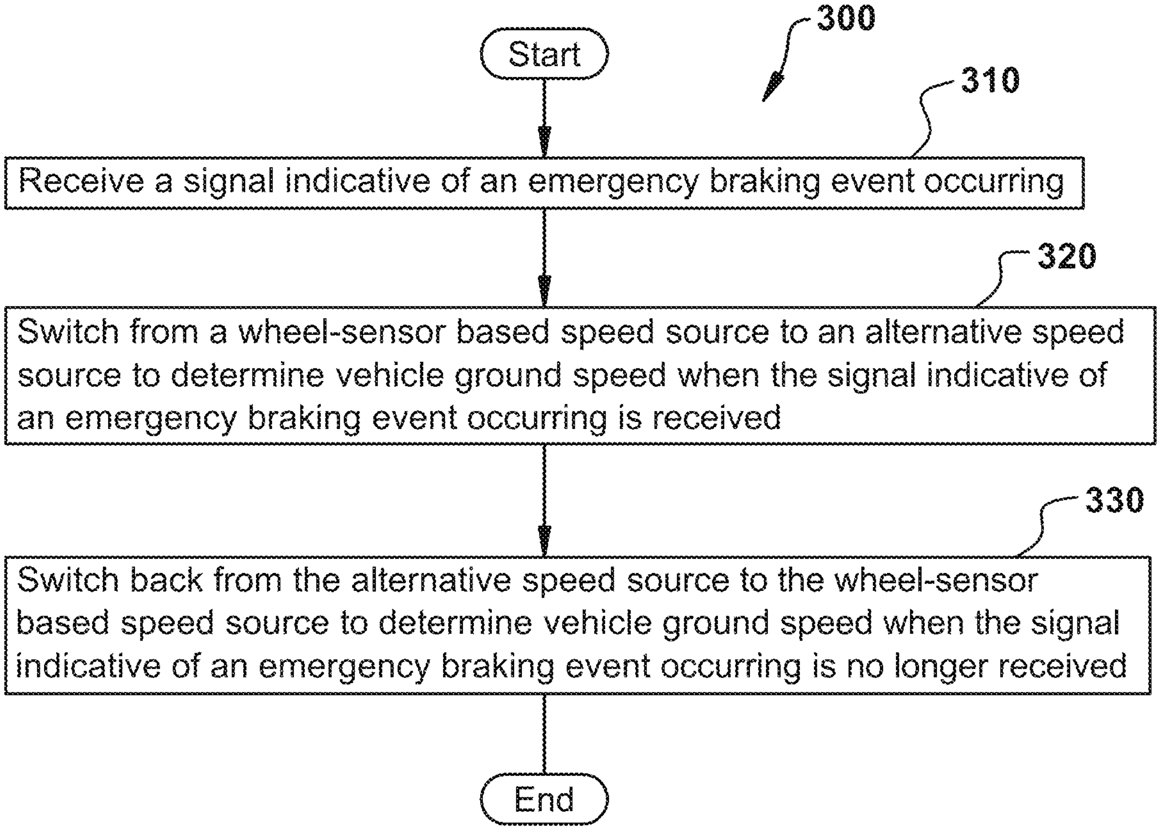
FIG. 3 is a flow diagram depicting an example method of operating the emergency brake control apparatus of FIG. 1 in accordance with another embodiment.

Referring to FIG. 3, a flow diagram 300 depicting an example method of operating the emergency brake control apparatus 100 of FIG. 1 in accordance with another embodiment is illustrated. In block 310, a signal indicative of an emergency braking event occurring is received.

Then in block 320, a switch is made from a wheel-sensor based speed source to an alternative speed source to determine vehicle ground speed when the signal indicative of an emergency braking event occurring is received. The process proceeds to block 330.

In block 330, a switch back is made from the alternative speed source to the wheel-sensor based speed source to determine vehicle ground speed when the signal indicative of an emergency braking event occurring is no longer received. The process then ends.

When a switch in block 320 or a switch back in block 330 is made, a signal can be provided on line 172 to the driver alerting device 170 (FIG. 1) to alert the vehicle driver of the switch or switch back. Alternatively, or in addition to, a signal can be provided to alert a fleet manager or other authorities of the switch or switch back.

In some embodiments, the signal indicative of an emergency braking event occurring is received in response to a human driver desiring to activate the emergency brakes of the vehicle train. As an example, a button may be located in a vehicle driver compartment of the tractor of the vehicle train to enable the human driver to operate the button to activate the emergency brakes.

In some embodiments, the signal indicative of an emergency braking event occurring is received in response to an autonomous driver. As an example, a vehicle controller may be arranged to activate the emergency brakes in response to a request from an autonomous driving system.

In some embodiments, the switch is made from the wheel-sensor based speed source to a global-positioning system that provides a signal indicative of vehicle ground speed.

In some embodiments, the switch is made from the wheel-sensor based speed source to a vision-based speed information source that provides a signal indicative of vehicle ground speed.

In some embodiments, the switch is made from the wheel-sensor based speed source to the alternative speed source when a wheel-speed difference between a wheel on a steering axle and a wheel on a drive axle is greater than a predetermined speed tolerance for at least a predetermined amount of time.

In some embodiments, the method is performed by a controller having a memory executing one or more programs of instructions which are tangibly embodied in a program storage medium readable by the controller.

It should be apparent that the parking brake controller 140 of FIG. 1 is arranged to (i) control the emergency brakes based upon a first signal from a first speed source (e.g., one or more wheel speed sensors) when the first signal is within a predetermined speed tolerance, and (ii) control the emergency brakes based upon a second signal from a second speed source (e.g., a GPS) when the first signal from the first speed source is outside of the predetermined speed tolerance. The first speed source may comprise a first wheel sensor coupled to a steering axle of a tractor of the vehicle train and a second wheel sensor coupled to a drive axle of the tractor. The predetermined speed tolerance may comprise a difference between an output signal from the first wheel sensor coupled to the steering axle and an output signal from the second wheel sensor coupled to the drive axle.

It should also be apparent that the above-described emergency brake control apparatus 100 provides an emergency brake system in which the emergency brakes can be applied automatically (i.e., without control by the vehicle driver) to slow and stop the vehicle train in the event the service brake system is unable to slow and stop the vehicle train.

It should further be apparent that the above-described emergency brake control apparatus 100 uses a parking brake system in which spring brakes can be applied based upon the output signals from the speed sources 120 and the pressure sensor 180 in response to an emergency braking event occurring.

It should also be apparent that the above-described emergency brake control apparatus 100 provides an emergency brake system for a vehicle train while the vehicle train is in motion. If the emergency brakes were to be applied while the vehicle train is stationary (i.e., the vehicle train is not moving), then there would be no need to change from one speed source to a different speed source.

Although the above description describes the emergency brake control apparatus 100 including the parking brake controller 140 (i.e., the parking brake controller 140 is controlling the emergency brakes), it is conceivable that the emergency brake control apparatus 100 does not include the parking brake controller 140 and is separate from the parking brake controller 140. As an example, the emergency brake control apparatus 100 may include a different controller, such as the one or more vehicle controllers 132 shown in FIG. 1. Moreover, it is conceivable that the emergency brake control apparatus 100 may include its own dedicated controller.

Program instructions for enabling the parking brake controller 140 shown in FIG. 1 to perform operation steps in accordance with flow diagram 200 shown in FIG. 2, or flow diagram 300 shown in FIG. 3, may be embedded in memory internal to parking brake controller 140. Alternatively, or in addition to, program instructions may be stored in memory external to parking brake controller 140. As an example, program instructions may be stored in memory internal to a different electronic controller unit of the vehicle, such as the one or more other vehicle controllers 132 shown in FIG. 1. Program instructions may be stored on any type of program storage media including, but not limited to, external hard drives, flash drives, and compact discs. Program instructions may be reprogrammed depending upon features of the particular electronic controller unit.

Aspects of disclosed embodiments may be implemented in software, hardware, firmware, or a combination thereof. The various elements of the system, either individually or in combination, may be implemented as a computer program product tangibly embodied in a machine-readable storage device for execution by a processor. Various steps of embodiments may be performed by a computer processor executing a program tangibly embodied on a computer-readable medium to perform functions by operating on input and generating output. The computer-readable medium may be, for example, a memory, a transportable medium such as a compact disk or a flash drive, such that a computer program embodying aspects of the disclosed embodiments can be loaded onto a computer.

Although the above description describes use of one electronic controller unit, it is conceivable that any number of electronic controller units may be used. Moreover, it is conceivable that any type of electronic controller unit may be used. Suitable electronic controller units for use in vehicles are known and, therefore, have not been described. Accordingly, the program instructions of the present disclosure can be stored on program storage media associated with one or more vehicle electronic controller units.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. An emergency brake control apparatus for a vehicle train having emergency brakes, the emergency brake control apparatus comprising:

a first speed source arranged to provide a first signal indicative of ground speed of the vehicle train;

a second speed source arranged to provide a second signal indicative of ground speed of the vehicle train;

a vehicle controller arranged to (i) control the emergency brakes based upon the first signal from the first speed source when the first signal is within a predetermined speed tolerance, and (ii) control the emergency brakes based upon the second signal from the second speed source when the first signal from the first speed source is outside of the predetermined speed tolerance, wherein (i) the first speed source comprises a first wheel sensor coupled to a steering axle of a tractor of the vehicle train and a second wheel sensor coupled to a drive axle of the tractor, and (ii) the predetermined speed tolerance comprises a difference between an output signal from the first wheel sensor coupled to the steering axle and an output signal from the second wheel sensor coupled to the drive axle.

2. An emergency brake control apparatus according to claim 1, wherein the vehicle controller comprises a brake controller that controls the emergency brakes based upon vehicle ground speed.

3. An emergency brake control apparatus according to claim 1 further comprising:

a button located in a vehicle driver compartment of a tractor of the vehicle train for enabling a vehicle driver to operate the button to activate the emergency brakes.

4. An emergency brake control apparatus according to claim 1, wherein the vehicle controller is arranged to activate the emergency brakes in response to a request from an autonomous driving system.

5. An emergency brake control apparatus according to claim 1 further comprising:

a driver alerting device for alerting a vehicle driver of when control of the emergency brakes is switched between the first and second signals.

6. An emergency brake control apparatus for a vehicle train having emergency brakes, the emergency brake control apparatus comprising:

a first speed source arranged to provide a first signal indicative of ground speed of the vehicle train, the first speed source comprising at least one wheel speed sensor providing the first signal;

a second speed source arranged to provide a second signal indicative of ground speed of the vehicle train, the second speed source comprising a combination of a camera, a radar, a Lidar, an inertial measurement unit, and a global-positioning system providing the second signal; and a vehicle controller arranged to (i) control the emergency brakes based upon the first signal from the first speed source when the first signal is within a predetermined speed tolerance, and (ii) control the emergency brakes based upon the second signal from the second speed source when the first signal from the first speed source is outside of the predetermined speed tolerance.

7. An emergency brake control apparatus according to claim 6, wherein the second speed source comprises a global-positioning system that provides the second signal.

8. An emergency brake control apparatus according to claim 6, wherein (i) the first speed source comprises a first of the at least one wheel sensors coupled to a steering axle of a tractor of the vehicle train and a second of the at least one of the wheel sensors coupled to a drive axle of the tractor, and (ii) the predetermined speed tolerance comprises a difference between an output signal from the first wheel sensor coupled to the steering axle and an output signal from the second wheel sensor coupled to the drive axle.

9. An emergency brake control apparatus according to claim 6, wherein the vehicle controller comprises a brake controller that controls the emergency brakes based upon vehicle ground speed.

10. An emergency brake control apparatus according to claim 6 further comprising:

a button located in a vehicle driver compartment of a tractor of the vehicle train for enabling a vehicle driver to operate the button to activate the emergency brakes.

11. An emergency brake control apparatus according to claim 6, wherein the vehicle controller is arranged to activate the emergency brakes in response to a request from an autonomous driving system.

12. An emergency brake control apparatus according to claim 6 further comprising:

a driver alerting device for alerting a vehicle driver of when control of the emergency brakes is switched between the first and second signals.

13. An emergency brake control apparatus for a vehicle train having emergency brakes, the emergency brake control apparatus comprising:

a first speed source arranged to provide a first signal indicative of ground speed of the vehicle train;

a second speed source arranged to provide a second signal indicative of ground speed of the vehicle train; and a vehicle controller arranged to (i) control the emergency brakes based upon the first signal from the first speed source when the first signal is within a predetermined speed tolerance, (ii) control the emergency brakes based upon the second signal from the second speed source when the first signal from the first speed source is outside of the predetermined speed tolerance, and (iii) activate the emergency brakes, without any vehicle driver intervention, when service brakes are unable to slow down or stop the vehicle train.

14. An emergency brake control apparatus according to claim 13, wherein (i) the first speed source comprises at least one wheel sensor coupled to a steering axle of a tractor of the vehicle train and a second wheel sensor coupled to a drive axle of the tractor, and (ii) the predetermined speed tolerance comprises a difference between an output signal from the first wheel sensor coupled to the steering axle and an output signal from the second wheel sensor coupled to the drive axle.

15. An emergency brake control apparatus according to claim 14, wherein the second speed source comprises a global-positioning system that provides the second signal.

16. An emergency brake control apparatus according to claim 13, wherein the vehicle controller comprises a brake controller that controls the emergency brakes based upon vehicle ground speed.

17. An emergency brake control apparatus according to claim 13 further comprising:

a button located in a vehicle driver compartment of a tractor of the vehicle train for enabling a vehicle driver to operate the button to activate the emergency brakes.

18. An emergency brake control apparatus according to claim 13, wherein the vehicle controller is arranged to activate the emergency brakes in response to a request from an autonomous driving system.

19. An emergency brake control apparatus according to claim 13 further comprising:

a driver alerting device for alerting a vehicle driver of when control of the emergency brakes is switched between the first and second signals.

* * * * *